United States Patent
Young et al.

(10) Patent No.: US 7,427,314 B2
(45) Date of Patent: Sep. 23, 2008

(54) DESICCANT CONTAINER AND METHOD OF MANUFACTURE

(75) Inventors: Robert W. Young, Belen, NM (US); Stephen J. Derby, Troy, NY (US)

(73) Assignee: Aridien, Inc., Belen, NM (US)

( * ) Notice: Subject to any disclaimer, the term of this patent is extended or adjusted under 35 U.S.C. 154(b) by 609 days.

(21) Appl. No.: 11/150,735

(22) Filed: Jun. 10, 2005

(65) Prior Publication Data

US 2005/0274259 A1    Dec. 15, 2005

Related U.S. Application Data

(60) Provisional application No. 60/579,442, filed on Jun. 14, 2004.

(51) Int. Cl.
*B01D 53/02* (2006.01)
(52) U.S. Cl. ....................................... 96/108
(58) Field of Classification Search ............. 96/108
See application file for complete search history.

(56) References Cited

U.S. PATENT DOCUMENTS

| | | | |
|---|---|---|---|
| 3,670,874 A | 6/1972 | Brunner | |
| 3,820,309 A * | 6/1974 | Cullen et al. | .......... 96/151 |
| 3,911,080 A | 10/1975 | Mehl et al. | |
| 4,162,863 A | 7/1979 | Gaudard et al. | |
| 4,327,575 A | 5/1982 | Locker | |
| 4,769,175 A | 9/1988 | Inoue | |
| 4,800,886 A | 1/1989 | Nestor | |
| 5,005,363 A | 4/1991 | Larin | |
| 5,120,585 A | 6/1992 | Sutter et al. | |
| 5,814,133 A | 9/1998 | Hunter et al. | |
| 6,251,344 B1 | 6/2001 | Goldstein | |
| 6,692,695 B1 | 2/2004 | Bronshtein et al. | |

\* cited by examiner

*Primary Examiner*—Robert A Hopkins
(74) *Attorney, Agent, or Firm*—Malcolm J. Chisholm, Jr.

(57) ABSTRACT

A desiccant container (10) includes a cylindrical body (12) having a first end (14) and an opposed second end (16). The cylindrical body (12) defines a desiccant chamber (18) within the cylindrical body (12) for holding the desiccant material within the chamber (18) between the first and second ends (14, 16). The cylindrical body (12) is made of a flexible, gas permeable, liquid impermeable material. A first disk (20) is secured adjacent the first end (14), and a second disk (22) secured adjacent the second end (16) to facilitate closing of the ends (14, 16) and to support maintenance of a cylindrical shape of the container (10) during usage of the desiccant container (10) in high-speed automated packaging machinery.

17 Claims, 1 Drawing Sheet

FIG.2a STEP 1

FIG.2b STEP 2

FIG.2c STEP 3

FIG.2d STEP 4

FIG.2e STEP 5

FIG.2f STEP 6

DESICCANT CONTAINER AND METHOD OF MANUFACTURE

CROSS REFERENCE TO RELATED APPLICATION

This Application claims the benefit of U.S. Provisional Patent Application Ser. No. 60/579,442 that was filed on Jun. 14, 2004, entitled "Desiccant Container and Method of Manufacture".

TECHNICAL FIELD

The present invention relates to apparatus for containing desiccant materials and to methods of manufacture of desiccant containers, and in particular relates to a low-cost, highly efficient desiccant container and to methods of manufacturing the container.

BACKGROUND ART

It is well known that desiccant materials are utilized within desiccant containers to remove moisture, oxygen, or other gases from a product while the product is packaged prior to usage by a consumer. Known desiccant containers include bags, odor absorbent packages, fragrance sachets, vapor corrosion inhibitor ("VCI") packaging, oxygen scavenging packets, and solid cylindrical canisters typically made of a translucent molded plastic having breathable ends. The most common use of desiccant materials is for pharmaceutical applications wherein a desiccant container is inserted within a bottle or other container of a pharmaceutical product to adsorb moisture and gasses. Silica crystals or powder is a typical desiccant material within the containers for such pharmaceutical usage.

There are literally dozens of other known desiccant materials, including for example activated alumina for drying gasses. Activated carbon has been used as an adsorbent for odors and toxic gases, and has been used in military gas masks. Other desiccant materials include metal salts, phosphorous compounds, activated charcoal, crystalline metal aluminosilicates, activated bentonites, silica gel, calcium sulfate, known molecular sieves, etc. For purpose herein, the phrase "desiccant material" will mean any material known in the art such as those recited above that is capable of removing an unwanted gaseous compound or molecules from a specific environment.

Typically, a selected desiccant material is placed within one of two forms of common desiccant containers. One form of desiccant container is a flexible bag that is formed of a breathable material, wherein gaseous exchange may occur through the entire container except through sealed ends of the bag or packet. A more common form of desiccant container is a cylindrical-shaped canister made of solid molded plastic having one or two breathable ends. U.S. Pat. No. 5,759,241 that was issued on Jun. 2, 1998 shows such a solid canister, wherein at least one breathable end includes perforations. A disk-shaped, fine pore member is secured to the end overlying the perforations to prohibit dusting or passage of fine particulates of the desiccant material from the canister onto the products, such as pharmaceutical pills, in a container housing the desiccant canister. The disk-shaped material is disclosed in that Patent as preferably made of a spun bonded polyolefin available under the trademark "TYVEK" from the E.I. Dupont Company of Wilmington, Del., U.S.A. (For purposes herein, a material that is characterized as "breathable" and that also has a sufficiently small pore size range to prohibit passage of liquid water and dusting of fine particulates will be hereafter characterized as being "gas permeable and liquid impermeable".)

Significant problems are associated with the selection of a form and size of a desiccant container because of inherent structural limitations of known cylindrical desiccant canisters. The cylindrical canisters are best suited for automated, high-speed insertion of the canisters into pharmaceutical bottles within specialized packaging machinery. Desiccant containers that are made of elongate bags secured together in a long strip of such bags pose a significant risk of being cut through the bag resulting in a spill of the desiccant material onto the packaging machine and possibly into the medicine bottle. Consequently, they are increasingly dis-favored as packaging machinery becomes ever-more efficient and high speed. Additionally, the large, distinctive cylindrical shape makes the plastic canister form of desiccant container clearly different than ordinary pharmaceutical pill shapes within medicine bottles, thus preventing accidental ingestion. However, because the molded cylindrical bodies of the desiccant canisters are made of a solid, gas and liquid impermeable material, and because they only provide for gaseous exchange through very fine pore, liquid impermeable ends to restrict passage of fine particles of the desiccant material out of the container, a rate of gaseous exchange and moisture passage through the canisters is necessarily restricted. Consequently, for a specific moisture or gas-cleaning requirement, cylindrical desiccant containers of solid plastic must be quite large to provide for adequate movement of gas into and out of the canister.

Manufacture of such molded plastic desiccant canisters typically involves injection of plastic into a mold of a cylindrical body. The body is then filled with the desiccant material, and then a cap, such as the perforated cap and disk-like dust barrier of the aforesaid U.S. Pat. No. 5,759,241, is secured to the body. While the resulting cylindrical, rigid, plastic desiccant containers are effective, the complicated manufacture and assembly of such desiccant containers significantly raises the cost of the containers to as high as about $0.20 (twenty cents U.S.) each. As an example of the scope of the demand for desiccant containers for pharmaceutical medicine bottles, it is generally known that a modern automated packaging machine for filling medicine bottles will insert such desiccant canisters at a rate in excess of 300 canisters per minute. It is estimated that current demand for known desiccant containers is in excess of 750,000,000 per year, and that number is expected to double in the near future.

Accordingly, there is a need for a desiccant container that has a low-cost to manufacture, that can more efficiently hold a desiccant material without a need for complicated manufacture and assembly of dust-passage restricting components, and that can be readily used within modern, high-speed packaging machinery.

DISCLOSURE OF THE INVENTION

The invention is a desiccant container for holding a desiccant material, wherein the desiccant container includes a cylindrical body having a first end and an opposed second end. The cylindrical body defines a desiccant chamber within the cylindrical body for holding the desiccant material within the chamber between the first and second ends. The first end and opposed second end are secured to the cylindrical body to prohibit movement of the desiccant material out of the desiccant chamber. The cylindrical body is made of a flexible, gas permeable, liquid impermeable material.

In a preferred embodiment, the desiccant container also includes a first disk secured adjacent the first end, and a second disk secured adjacent the second end, wherein the first disk has an outer diameter about the same as an inner diameter of the desiccant chamber adjacent the first end, and wherein the second disk has an outer diameter about the same as an inner diameter of the desiccant chamber adjacent the second end. (For purposes herein, the word "about" is to mean plus or minus ten percent.) The first and second disks provide for facility of sealing the first and second ends, and for maintaining a cylindrical shape. The first and second disks may be secured to the first and second ends from within or from outside of the cylindrical chamber. The first and second disks may also be either rigid or flexible, gas permeable or solid, adhesive or non-adhesive. In a further preferred embodiment, the first disk and/or second disk may be secured to the first and/or second ends from within the desiccant chamber and may be dimensioned to define an outer diameter that is about five percent to about twenty percent less than an inner diameter of the desiccant chamber adjacent the first and/or second disk. By having the first and second disks smaller than the inner diameters of the desiccant chamber, the first and second ends may be readily dimensioned to form a rounded or chamfered edge surrounding the disks adjacent the ends. The rounded edge will assist in automated processing of the desiccant containers in modern, high-speed packaging machinery.

In further preferred embodiments, the first and second ends may be end-extensions of the material defining the cylindrical body, wherein the end-extensions are folded or crimped, as in a well known "shot-gun shell", so that the folded end-extensions are bonded or otherwise secured together to prevent passage of the desiccant material through the ends. The end-extensions may also be cut forming flaps that are alternately folded to form the end, and the cut, alternately folded flaps may be bonded to the disks adjacent the ends to secure the ends against passage of the desiccant material through the ends. Additionally, the end-extensions may be folded over, or cut into flaps and alternately folded, and then the disks may be bonded to the end-extensions to secure or close the ends. The end-extensions may alternately be simply tied by a string or metal clasp to close the ends. In a further embodiment, a spacer, such as a small glob of glue or silicone, may be affixed to at least one end to facilitate automatic insertion of the desiccant containers in high-speed packaging equipment.

The invention also includes a method of manufacturing the desiccant container for holding a desiccant material. The method includes the steps of: a. forming a flexible, gas permeable, liquid impermeable material into a cylindrical body, the cylindrical body having a first end and an opposed second end dimensioned so that a desiccant chamber is defined within the cylindrical body for holding the desiccant material between the first and second ends; b. then, closing the first end so that desiccant material cannot pass through the first end; c. then, filling the desiccant chamber with the desiccant material; and, d. then, closing the second end so that the desiccant material cannot pass through the second end.

The method of making the desiccant container may also include the additional step of securing the first disk adjacent the first end within the desiccant chamber prior to closing the first end and then closing the first end; then the step of filling the desiccant chamber with the desiccant material; and, then securing the second disk adjacent the second end within the desiccant chamber prior to closing the second end and then closing the second end, wherein the first and second disks have outer diameters about the same as inner diameters of the desiccant chamber adjacent the first and second ends. By inserting the disks within the desiccant chamber prior to closing the ends, end-extensions of the material making up the cylindrical body may be readily folded onto the disks, or cut into flaps with each flap alternately folded onto the disk, and then bonded to the disks to close the ends against movement of the desiccant material through the ends. The invention also includes forming a rounded or chamfered edge on the desiccant container by the additional step of securing a disk adjacent an end of the desiccant chamber wherein the disk has a diameter less than an inner diameter of the desiccant chamber adjacent the end; and then forming the end-extensions of the desiccant container over the disk to form the rounded, chamfered edge.

Accordingly, it is a general purpose of the present invention to provide a desiccant container and method of manufacture of the container that overcomes deficiencies of the prior art.

It is a more specific purpose to provide a desiccant container and method of manufacture of the container that efficiently provides a container having a high rate of gaseous exchange through a gas permeable cylindrical body, that may contain more desiccant material than a prior art desiccant container of the same overall volume, and that may be used in high-speed packaging equipment.

These and other purposes and advantages of the present desiccant container and method of manufacture will become more readily apparent when the following description is read in conjunction with the accompanying drawings.

BRIEF DESCRIPTION OF THE DRAWINGS

FIG. 2 is a simplified, schematic view showing a sequence of six steps in a method of manufacture of the desiccant container of the present invention.

DESCRIPTION OF THE PREFERRED EMBODIMENTS

Figure 1:
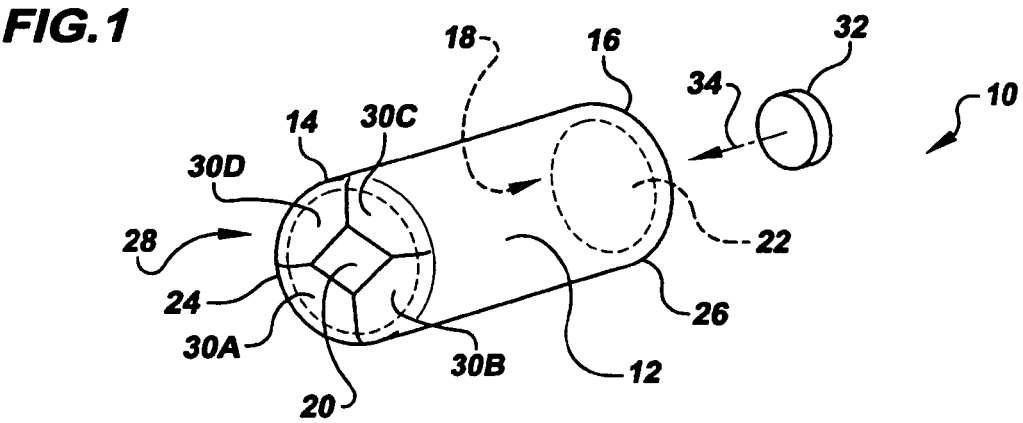
FIG. 1 is perspective view of a desiccant container constructed in accordance with the present invention.
Figure 1:
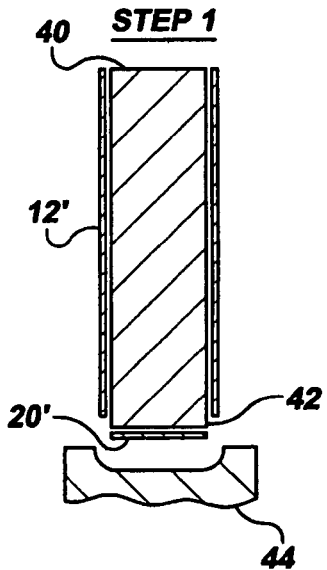
Figure 1:
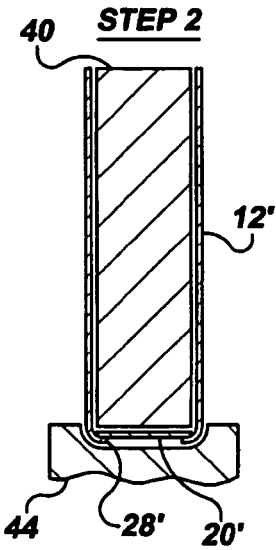
Figure 1:
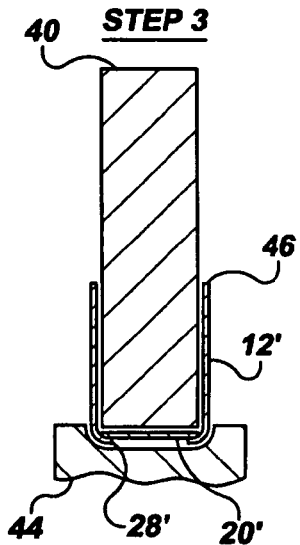
Figure 1:
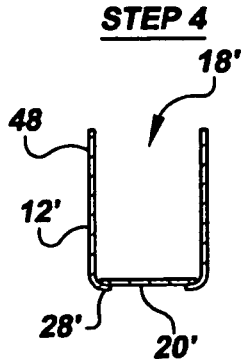
Figure 1:
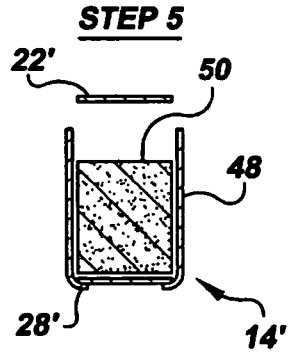
Figure 1:
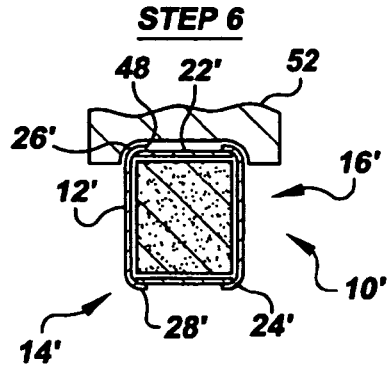

Referring to the drawings in detail, a desiccant container of the present invention is shown in FIG. 1, and is generally designated by the reference numeral 10. The desiccant container 10 includes a cylindrical body 12 having a first end 14 and an opposed second end 16. The cylindrical body 12 defines a desiccant chamber 18 within the body 12 between the first end 14 and the second end 16. The first end 14 and second end 16 are secured to the cylindrical body 12 to prohibit movement of any desiccant material (not shown in FIG. 1) out of the body 12. The cylindrical body 12 is made of a flexible, gas permeable, liquid impermeable material. (For purposes herein, the word "flexible" is to mean that the cylindrical body 12 may be easily deformed from a cylindrical shape by a force applied between a finger and thumb of a user of the desiccant container 10.) An exemplary gas permeable, liquid impermeable material is available under the trademark "TYVEK" from the E.I. DuPont company of Wilmington, Del., U.S.A., and is a spun bound polyolefin. The gas permeable, liquid impermeable material is available in many thicknesses and variations. A preferred variation is available from the DuPont company under the trade designation "1059B" with an "RP30" coating, having a thickness of between about 0.002 and 0.011 inches.

In a preferred embodiment, the desiccant container 10 also includes a first disk 20 secured adjacent the first end 14, wherein the first disk 20 may have an outer diameter about the same as the inner diameter of the desiccant chamber 18 adjacent the first end 14. Similarly, a second disk 22 may be secured adjacent the second end 16, and the second disk 16 may have an outer diameter about the same as an inner diameter of the desiccant chamber 18 adjacent the second end 16. (It is stressed again that "about" herein is to mean plus or minus ten percent.) As shown in FIG. 1, the first and second disks 20, 22 may be secured adjacent the first and second ends 14, 16 from within the desiccant chamber 18. Alternatively, the first and second disks 20, 22 may be secured adjacent the first and second ends 14, 16 of the container 10 from outside (not shown) the desiccant chamber 18. The first and second disks 20, 22 may be made of a rigid or flexible material, and they may have an adhesive coating on either of their sides.

The first and/or second ends 20, 22 may also be dimensioned to have outer diameters that are about five percent to about twenty percent less than an inner diameter of the desiccant chamber 18 adjacent the first and/or second disks 20, 22. By having the first and second disks, 20, 22 smaller than the inner diameters of the desiccant chamber 18, the first and second ends 20, 22 may be readily dimensioned to form rounded or chamfered edges 24, 26 surrounding the disks 20, 22 adjacent the ends 14, 16, instead of square edges (not shown) that result from the outer diameters of the disks 20, 22 having diameters about the same as inner diameters of the desiccant chamber 18 adjacent the ends 14, 16. The rounded edges 24, 26 will assist in automated processing of the desiccant containers in modern, high-speed packaging machinery. For ease of orientation, only one of the first or second disks 20, 22 may have the reduced outer diameter so that the container 10 has only one rounded edge 24.

The first and second ends 14, 16 may be end-extensions of the material making up the cylindrical body 12. For example, and as shown in FIG. 1 in association with the first end 14, a first end-extension 28 may extend past the first disk 20 in a direction away from the desiccant chamber 18 and be folded or crimped over the desiccant chamber 18 to close the first end 14. (For purposes herein, the phrase "close the end", is to mean that the desiccant material cannot pass through the end.) The first end-extension 28 may be folded, crimped, tied off with a metal or string clasp (not shown), bonded to itself, etc., in any manner known in the art, hereinafter being referred to as the first end-extension 28 including closing means for closing the first end 14. (For purposes herein, the phrase "bonded" is to mean use of preferably an impulse heater, a radiant heater, an ultra sonic heater, or any other known mechanism or known compound such as adhesives, etc. that may be applied to or imposed upon the gas permeable, liquid impermeable material to achieve a closing of the material to close the end.)

Alternatively, the first end-extension may be cut to form a plurality of flaps 30A, 30B, 30C, 30D, and the flaps may be folded sequentially or alternately to enhance an efficient closing of the first end 14. The plurality of flaps 30A, 30B, 30C, 30D may be bonded to each other to close the first end, or preferably, the flaps may be folded onto the first disk 20 and bonded to the disk 20 to close the first end 14. Additionally, the flaps 30A, 30B, 30C, 30D may be folded and bonded to each other to close the first end 14, and then the first disk 14 may be bonded to the flaps to enhance maintenance of the cylindrical shape of the container 10, and to facilitate handling of the container 10 in automated packaging machinery (not shown). The plurality of flaps 30A, 30B, 30C, 30D may include the four flaps shown, or preferably, the first end-extension 28 may include eight flaps (not shown).

In a further preferred embodiment, the desiccant container 10 may also include a spacer 32 secured to one or both ends 14, 16 of the container 10, such as secured to the second end 16, as shown by the directional arrow 34 in FIG. 1. The spacer may consist of a small glob of a glue or silicone, or a nodule of hot glue. An optimal axial length of the spacer 32 is about five to about ten percent of the axial length of the container 10. The spacer 32 provides a break between a plurality of virtually identical desiccant containers 10 aligned in an automated packaging machine.

The present invention also includes a method of manufacturing the desiccant container 10. The method includes the steps of: a. forming a flexible, gas permeable, liquid impermeable material into a cylindrical body 12, the cylindrical body having a first end 14 and an opposed second end 16 dimensioned so that the desiccant chamber 18 is defined within the cylindrical body 12 for holding the desiccant material between the first and second ends 14, 16; b, then, closing the first end 14 so that desiccant material cannot pass through the first end 14; c. then, filling the desiccant chamber 18 with the desiccant material; and, d. then, closing the second end 16 so that the desiccant material cannot pass through the second end 16.

As described above, the method of making the desiccant container 10 may also include the additional step of securing the first disk 20 adjacent the first end 14 within the desiccant chamber prior to closing the first end 14 and then closing the first end 14; then the step of filling the desiccant chamber 18 with the desiccant material; and, then securing the second disk 22 adjacent the second end 16 within the desiccant chamber 18 prior to closing the second end 16 and then closing the second end 16, wherein the first and second disks 20, 22 have outer diameters about the same as inner diameters of the desiccant chamber 18 adjacent the first and second ends 14, 16. By inserting the disks within the desiccant chamber 18 prior to closing the ends 14, 16, the first end-extension 28 and a second end-extension (not shown in FIG. 1) of the material making up the cylindrical body 12 may be readily folded onto the disks 20, 22, or cut into flaps 30A, 30B, 30C, 30D with each flap sequentially or alternately folded onto the disk 20, 22, and then bonded to the disks, 20, 22 to close the ends 14, 16 against movement of the desiccant material through the ends 14, 16.

The inventors of the present invention put forth great effort to efficiently close the desiccant container 10 being made of the flexible, gas permeable, liquid impermeable material. A variety of methods proved effective, and some of the methods of closing the opposed first and second ends 14, 16 proved especially effective and efficient. For example, one effective method (not shown) involved simply tying the first end-extension 28 with a string, such as monofilament line, or with a metal clasp, much as "chub" tubes are made for holding baking goods. In addition, that method also included closing the first end 14 by tying the first end-extension 28, then filling the desiccant chamber 18 with a desiccant material, and then applying a vacuum to the desiccant chamber 18 while closing the second end 16 by tying a second end-extension (not shown). While an effective desiccant container was produced thereby, use of the vacuum adds manufacturing requirements.

An additional method of closing the ends 14, 15 included simply folding and crimping the first and second end-extensions of the material making up the cylindrical body 12, much as the crimping of a discharge end of a shut-gun shell. Simply folding and bonding the end-extensions also produced an acceptable desiccant container 10. However, without care in manufacture of such embodiments, the resulting desiccant containers could occasionally deteriorate out of a cylindrical shape upon subsequent handling.

The optimal solution to this substantial engineering challenge was finally overcome when the inventor came up with the idea of inserting the first and second disks 20, 22 into or onto the container 10. That provided for facility in manufacture, and stability in usage of the desiccant container.

FIG. 2 shows in a sequence of simplified schematic drawings labeled "STEP 1-STEP 6" a preferred method of making a desiccant container 10' where first and second disks are inserted in an efficient method of manufacture. (In FIG. 2, components of the desiccant container 10 shown in FIG. 1 that are virtually identical to the container 10 of FIG. 1 are shown in FIG. 2 with reference numerals that are primes of the FIG. 1 reference numerals, such as 10' for the desiccant container shown in FIG. 2.) In STEP 1 of FIG. 2, a forming tube 40 is shown being wrapped with the gas permeable, liquid impermeable material to form a cylindrical body 12'. The cylindrical body 12' extends almost to a bottom 42 of the forming tube 40. A first disk 20' is inserted adjacent to the bottom 42 of the forming tube 40. In STEP 2, the material making up the cylindrical body 12' is moved downward over the bottom 42 of the forming tube 40, and over the first disk 20' so that a first end-extension 28' extends into a rounding element 44 that directs the first end-extension 28' over the first disk 20'. The rounding element 44 may include a plurality of cutting heads, or a single rotating head (not shown), to cut the first end-extension 28' into a plurality of flaps, as described above. The rounding element 44 may also apply heat, pressure, or any bonding agent or method to secure the first end-extension 28' to the first disk 20' to form and close the first end 14'.

In STEP 3, a slice 46 is made around the material making up the cylindrical barrel 12' so that the desired amount of material is cut off to define the cylindrical barrel 12' and a second end-extension 48 (shown in STEPS 4-6). Next, in STEP 4, the formed but empty cylindrical barrel 12' is removed from the forming tube 40, such as in an automated manufacturing sequence. Next in STEP 5, a desiccant material 50 is added to the desiccant chamber 18' defined by the cylindrical body 12'. Additionally, the second disk 22' is positioned within the desiccant chamber 18' over the desiccant material 50. Finally, in STEP 6 a second rounding element 52 is applied to the second end-extension 48 to apply heat, pressure, adhesive, or otherwise bond the second end-extension 48 to the second disk 22' to form the second end 16'. The second rounding element 52 may also include a plurality of cutting heads, or a single rotating head (not shown), to cut the second end-extension 48 into a plurality of flaps, as described above to form and close the second end 16'. This results in a completed desiccant container 10' having a first rounded edge 24' and a second rounded edge 26'. This efficient manufacturing process may be implemented on existing machinery resulting in an extremely rapid, low-cost manufacture of a very efficient desiccant container 10, 10' that can be readily applied through existing packaging machinery to containers needing desiccant protection, instead of using the known solid plastic molded desiccant canisters with breathable ends that are known in the art to be costly, bulky and expensive.

While the present invention has been disclosed with respect to the described and illustrated embodiments of a desiccant container 10, 10' and method of manufacture thereof, it is to be understood that the invention is not to be limited to those embodiments. Accordingly, reference should be made primarily to the following claims rather than the foregoing description to determine the scope of the invention.

What is claimed is:

1. A desiccant container (10) for holding a desiccant material (50), the desiccant container (10) comprising:
  a. a cylindrical body (12) having a first end (14) and an opposed second end (16) defining a desiccant chamber (18) within the cylindrical body (12) for holding the desiccant material (50) within the chamber (18) between the first and second ends (14, 16);
  b. the first end (14) and opposed second end (16) secured to the cylindrical body (12) to prohibit movement of the desiccant material (50) out of the desiccant chamber (18);
  c. a first disk (20) secured adjacent the first end (14), and a second disk (22) secured adjacent the second end (16); and,
  d. the cylindrical body (12) being made of a flexible, gas permeable, liquid impermeable material.

2. The desiccant container (10) of claim 1, wherein the first disk (20) has an outer diameter about the same as an inner diameter of the desiccant chamber (18) adjacent the first end (14), and wherein the second disk (22) has an outer diameter about the same as an inner diameter of the desiccant chamber (18) adjacent the second end (16).

3. The desiccant container (10) of claim 1, wherein the first disk (20) has an outer diameter that is about five percent to about twenty per cent less than an inner diameter of the desiccant chamber (18) adjacent the first end (14), so that the cylindrical body (12) forms a first rounded edge (24) adjacent the first end (14).

4. The desiccant container (10) of claim 1, wherein the second disk (22) has an outer diameter that is about five percent to about twenty per cent less than an inner diameter of the desiccant chamber (18) adjacent the second end (16), so that the cylindrical body (12) forms a second rounded edge (26) adjacent the second end (16).

5. The desiccant container (10) of claim 1, wherein the first disk (20) is secured within the desiccant chamber (18).

6. The desiccant container (10) of claim 1, wherein the second disk (22) is secured within the desiccant chamber (18).

7. The desiccant container (10) of claim 1, wherein the first disk (20) and the second disk (22) are made of a breathable material.

8. The desiccant container (10) of claim 1, wherein the first disk (20) and the second disk (22) are made of a rigid material.

9. A desiccant container (10) for holding a desiccant material (50), the desiccant container (10) comprising:
  a. a cylindrical body (12) having a first end (14) and an opposed second end (16) defining a desiccant chamber (18) within the cylindrical body (12) for holding the desiccant material (50) within the chamber (18) between the first and second ends (14, 16);
  b. the first end (14) and opposed second end (16) secured to the cylindrical body (12) to prohibit movement of the desiccant material (50) out of the desiccant chamber (18);
  c. the cylindrical body (12) being made of a 15 flexible, gas permeable, liquid impermeable material; and,
  d. wherein the first end (14) includes a first end-extension (28) extending from the container (12) in a direction away from the desiccant chamber (18), the first end-extension (28) including a plurality of flaps (30A, 30B, 30C, 30D) dimensioned to fold to each other to close the first end (14).

10. The desiccant container (10) of claim 9, wherein a first disk (20) is secured within the desiccant chamber (18) adjacent the first end (14), and the plurality of flaps (30A, 30B, 30C, 30D) are dimensioned to fold over the first disk (20) to close the first end (14).

11. A desiccant container (10) for holding a desiccant material (50), the desiccant container (10) comprising:
  a. a cylindrical body (12) having a first end (14) and an opposed second end (16) defining a desiccant chamber

(18) within the cylindrical body (12) for holding the desiccant material (50) within the chamber (18) between the first and second ends (14, 16);

b. the first end (14) and opposed second end (16) secured to the cylindrical body (12) to prohibit movement of the desiccant material (50) out of the desiccant chamber (18);

c. the cylindrical body (12) being made of a flexible, gas permeable, liquid impermeable material; and, d. a spacer (32) secured to at least the first end (14) or the second end (16) of the desiccant container (10).

12. A method of manufacturing a desiccant container (10) for holding a desiccant material (50), the method comprising the steps of:

a. forming a flexible, gas permeable, liquid impermeable material into a cylindrical body (12), the cylindrical body (12) having a first end (14) and an opposed second end (16) dimensioned so that a desiccant chamber (18) is defined within the cylindrical body (12) for holding the desiccant material (50) between the first and second ends (14, 16);

b. then, closing the first end (14) so that the desiccant material (50) cannot pass through the first end (14);

c. then, filling the desiccant chamber (18) with the desiccant material (50); and, d. then, closing the second end (16) so that the desiccant material (50) cannot pass through the second end (16).

13. The method of making the desiccant container (10) of claim 12, comprising the further steps of, after the step of closing the first end (14), securing a first disk (20) adjacent the first end (14), and after the step of closing the second end (16), securing a second disk (22) adjacent the second end (16).

14. The method of making the desiccant container (10) of claim 12, wherein the step of closing the first end (14) comprises the further step of securing a first disk (20) adjacent the first end (14) within the desiccant chanter (16) prior to closing the first end (14) and then closing the first end (14), and wherein the step of closing the second end (16) comprises the further step of securing a second disk (22) adjacent the second end (16) within the desiccant chamber (18) prior to closing the second end (16).

15. The method of manufacturing a desiccant container (10) of claim 14, comprising the further step of rounding a first end-extension (28) over the first disk (20) to form a first rounded edge (24) and rounding a second end-extension (30) over the second disk (22) to form a second rounded edge (26).

16. A method of manufacturing a desiccant container (10') for holding a desiccant material (50), the method comprising the steps of:

a. wrapping a flexible, gas permeable, liquid impermeable material around a forming tube (40) to form a cylindrical body (12');

b. then, inserting a first disk (20') adjacent a bottom (42) of the forming tube (40);

c. then, moving the cylindrical body (12') over the bottom (42) of the forming tube (40) and over the first disk (20') so that a first end-extension (28') extends beyond the first disk (20');

d. rounding the first end-extension (28') over the first disk (20') to form and close a first end (14') of the desiccant container (10');

e. removing the cylindrical body (12') from the forming tube (40);

f. then, inserting desiccant material (50) into the desiccant chamber (18') of the desiccant container (10');

g. then inserting a second disk (22') into the desiccant chamber (18') over the desiccant material (50) adjacent a second end (16') of the desiccant container (10'); and, h. then rounding a second end-extension (30') over the second disk (22') to close the second end (16').

17. The method of making a desiccant container (10') of claim 16, comprising the further steps of forming a first rounded edge (24') at the first end (14') of the container (10') by, before the step of rounding the first end-extension (28'), inserting the first disk (20'), wherein the first disk (20') has an outer diameter that is about five percent to about twenty per cent less than an inner diameter of the desiccant chamber (18') adjacent the first end (14') of the desiccant container (10'), and forming a second rounded edge (26') at the second end (16') by, before the step of rounding the second end-extension (30'), inserting the second disk (22'), wherein the second disk (22') has outer diameter that is about five percent to about twenty percent less than an inner diameter of the desiccant chamber (18') adjacent the second end (16') of the desiccant container (10').

* * * * *